(12) United States Patent
Iizuka et al.

(10) Patent No.: US 10,755,467 B2
(45) Date of Patent: Aug. 25, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Naoya Iizuka, Yokohama (JP); Kenichi Nagae, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 39 days.

(21) Appl. No.: 16/149,646

(22) Filed: Oct. 2, 2018

(65) Prior Publication Data
US 2019/0108670 A1 Apr. 11, 2019

(30) Foreign Application Priority Data

Oct. 6, 2017 (JP) .................. 2017-196054

(51) Int. Cl.
*G06T 19/00* (2011.01)
*G06T 15/00* (2011.01)

(52) U.S. Cl.
CPC ............ *G06T 15/005* (2013.01); *G06T 19/00* (2013.01); *G06T 2200/04* (2013.01); *G06T 2200/08* (2013.01); *G06T 2219/008* (2013.01)

(58) Field of Classification Search
CPC .......................................... G06T 2207/30004
USPC ....................................................... 345/419
See application file for complete search history.

(56) References Cited

U.S. PATENT DOCUMENTS

| | | | |
|---|---|---|---|
| 9,693,753 B2* | 7/2017 | Someda | A61B 5/0095 |
| 2014/0222157 A1* | 8/2014 | Al Hares | A61F 2/30948 |
| | | | 623/20.34 |
| 2014/0316270 A1 | 10/2014 | Irisawa | |
| 2015/0164472 A1* | 6/2015 | Someda | A61B 5/0095 |
| | | | 600/447 |
| 2018/0182091 A1* | 6/2018 | MacKinnon | G06T 7/0012 |

FOREIGN PATENT DOCUMENTS

JP 2013-150787 A 8/2013

\* cited by examiner

*Primary Examiner* — Thomas J Lett
(74) *Attorney, Agent, or Firm* — Canon U.S.A., Inc. IP Division

(57) ABSTRACT

An image processing apparatus according to the present disclosure includes a data acquisition unit configured to acquire data in which three-dimensional medical image data and supplementary information are associated with each other, a cross section information acquisition unit configured to acquire the supplementary information from the data and acquire cross section information indicating a cross section based on the supplementary information, a cross-sectional image generation unit configured to generate cross-sectional image data corresponding to the cross section based on the three-dimensional medical image data and the cross section information, and a display control unit configured to cause a display unit to display an image based on the cross-sectional image data.

15 Claims, 9 Drawing Sheets

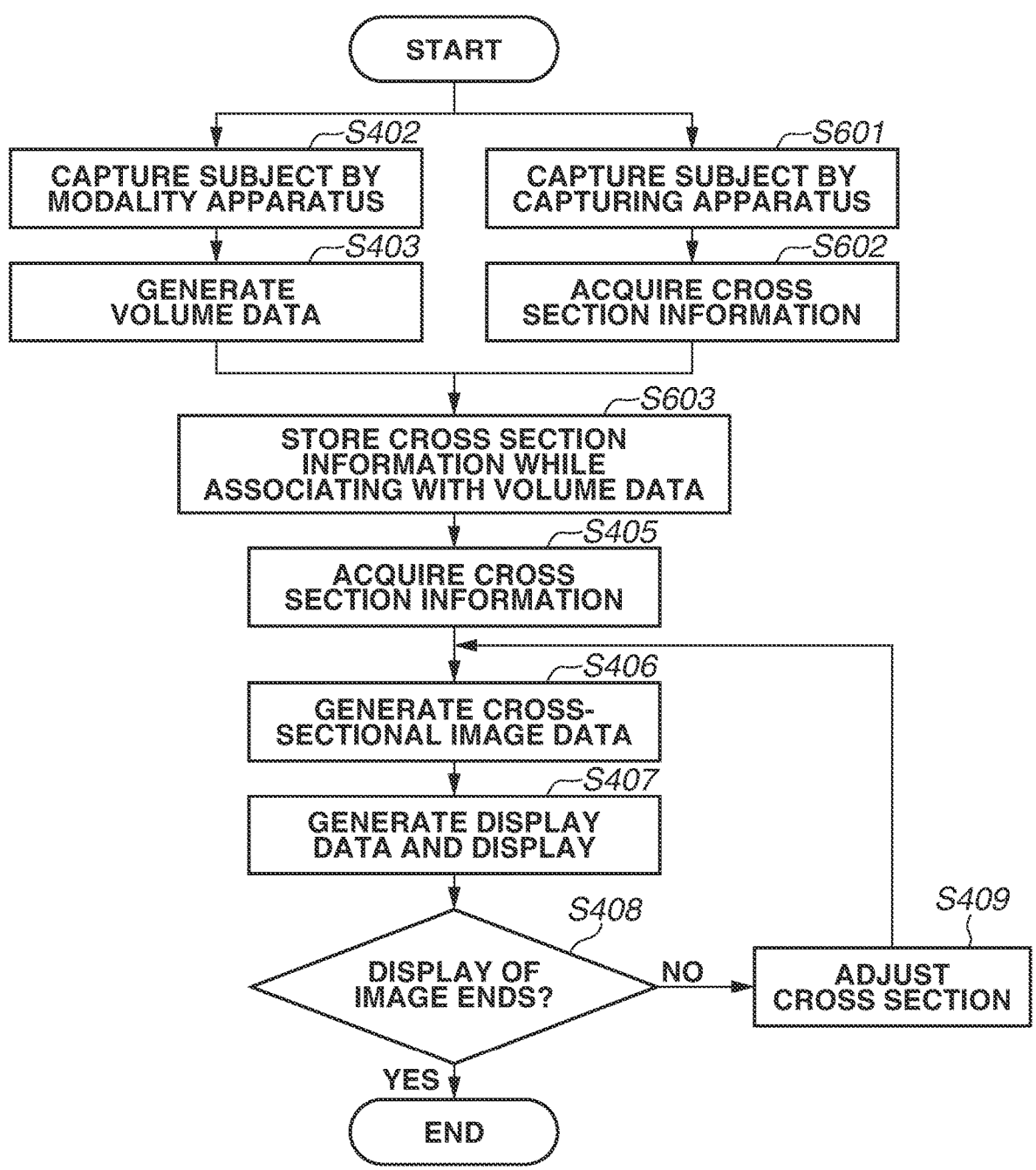

IMAGE PROCESSING APPARATUS, IMAGE PROCESSING METHOD, AND STORAGE MEDIUM

BACKGROUND

Field of the Disclosure

The present disclosure relates to an image processing technique for three-dimensional medical image data.

Description of the Related Art

There is a photoacoustic capturing apparatus that is one example of a modality apparatus that generates three-dimensional medical image data (volume data). The photoacoustic capturing apparatus can acquire information regarding a characteristic value of a subject as the three-dimensional medical image data based on a photoacoustic wave generated due to irradiation of the subject with light.

Japanese Patent Application Laid-Open No. 2013-150787 discusses an acoustic image generation apparatus that generates and displays a cross-sectional image from volume data generated based on a photoacoustic signal. Japanese Patent Application Laid-Open No. 2013-150787 discusses the acoustic image generation apparatus that sets a two-dimensional plane defining the cross-sectional image according to an initial setting or an input from a user.

In a case where a desired cross section is different for each imaging operation, it is difficult to generate the cross-sectional image of the desired cross section by means of the initial setting. Further, as for the method that sets the cross section defining the cross-sectional image by means of the input from the user, a complicated operation may be required to set the desired cross section each time the imaging is carried out.

SUMMARY

Some embodiments in the present disclosure are directed to providing an image processing apparatus capable of easily generating the cross-sectional image data for the three-dimensional medical image data that corresponds to the desired cross section.

An image processing apparatus according to one aspect includes a data acquisition unit configured to acquire data in which three-dimensional medical image data and supplementary information are associated with each other, a cross section information acquisition unit configured to acquire the supplementary information from the data and acquire cross section information indicating a cross section based on the supplementary information, a cross-sectional image generation unit configured to generate cross-sectional image data corresponding to the cross section based on the three-dimensional medical image data and the cross section information, and a display control unit configured to cause a display unit to display an image based on the cross-sectional image data.

Further features of the various embodiments will become apparent from the following description of exemplary embodiments with reference to the attached drawings.

BRIEF DESCRIPTION OF THE DRAWINGS

FIG. 9 is a flowchart of an image processing method performed by the system according to the third exemplary embodiment.

DESCRIPTION OF THE EMBODIMENTS

Figure 1:
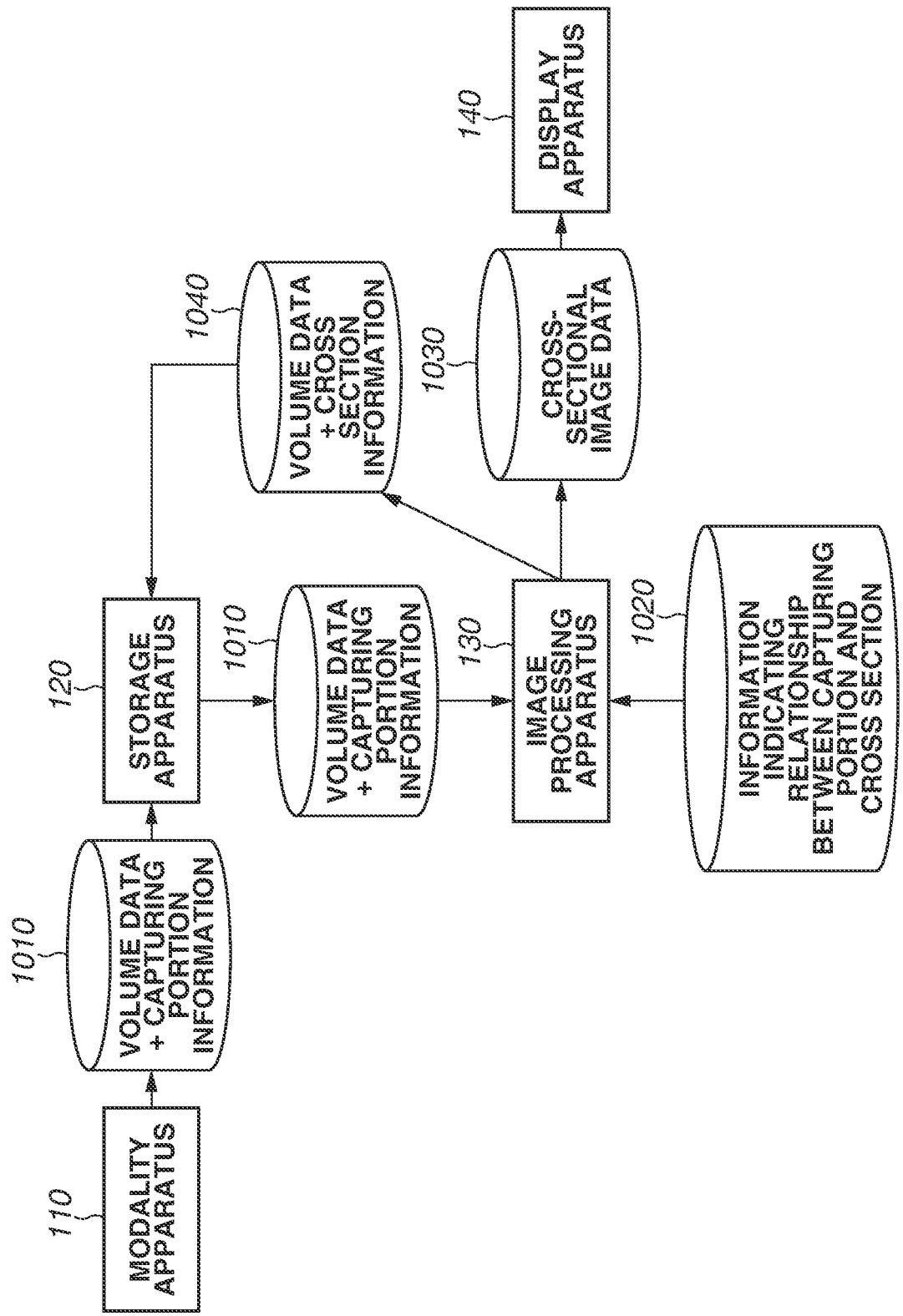
FIG. 1 is a block diagram of apparatuses included in a system according to a first exemplary embodiment and data exchanged among the apparatuses.

In the following description, a first exemplary embodiment will be described with reference to the drawings. FIG. 1 illustrates a block diagram of apparatuses included in a system according to the present exemplary embodiment and data exchanged among the apparatuses.

The system according to the present exemplary embodiment includes a modality apparatus (medical image capturing apparatus) 110, a storage apparatus 120, an image processing apparatus 130, and a display apparatus 140.

The modality apparatus 110 captures a subject, generates three-dimensional medical image data (hereinafter also referred to as volume data) 1010 of the subject, and outputs the data 1010 to the storage apparatus 120. The storage apparatus 120 stores the received volume data 1010 therein. Information indicating a capturing portion (capturing portion information) is associated with the volume data 1010 as supplementary information.

The modality apparatus 110 is an apparatus such as a photoacoustic capturing apparatus, an ultrasonic diagnostic apparatus, a magnetic resonance imaging (MRI) apparatus, and an X-ray computerized tomography (CT) apparatus. In the following description, the present exemplary embodiment will be described referring to an example in which the photoacoustic capturing apparatus is employed as the modality apparatus 110. The photoacoustic capturing apparatus is an apparatus that generates information about a characteristic value corresponding to each of a plurality of positions in the subject with use of a reception signal acquired when a photoacoustic wave generated due to light irradiation is received. In other words, the photoacoustic capturing apparatus is an apparatus that generates a three-dimensional spatial distribution of characteristic value information derived from the photoacoustic wave as the three-dimensional medical image data.

The three-dimensional medical image data generated by the photoacoustic capturing apparatus reflects an amount and a rate of absorption of light energy. Examples of the three-dimensional medical image data generated by the photoacoustic capturing apparatus include an acoustic pressure of the generated acoustic wave (an initial acoustic pressure), a density of the absorption of the light energy, a light absorption coefficient, and information regarding a concentration of a substance forming a tissue. The information regarding the concentration of the substance is, for example, an oxygen saturation in blood, a total concentration of hemoglobin, or a concentration of oxyhemoglobin or deoxyhemoglobin. Further, the information regarding the concentration of the substance may be a glucose concentration, a collagen concentration, a melanin concentration, a volume fraction of fat or water, or the like.

The storage apparatus 120 may be a storage medium, such as a read only memory (ROM), a magnetic disk, and a flash memory. Also, the storage apparatus 120 may be a storage server via a network, such as a picture archiving and communication system (PACS).

The image processing apparatus 130 reads out the volume data 1010 from the storage apparatus 120, thereby acquiring the volume data 1010. The image processing apparatus 130 generates cross-sectional image data 1030, which is subject to be displayed as a cross sectional image, based on the volume data 1010, and outputs the data 1030 to the display apparatus 140. The display apparatus 140 displays a cross sectional image based on the received cross-sectional image data 1030. The image processing apparatus 130 may function as a display control unit that causes the display apparatus 140 to display the cross sectional image based on the cross-sectional image data 1030.

At this time, the image processing apparatus 130 acquires information 1020 indicating a relationship between each of the plurality of capturing portions and a cross section. The image processing apparatus 130 generates the cross-sectional image data 1030 from the volume data 1010 based on the capturing portion information associated with the volume data 1010 and the information 1020 indicating the relationship between the capturing portion and the cross section. Details of a method for generating the cross-sectional image data 1030 will be described below. For example, the information 1020 indicating the relationship between the capturing portion and the cross section is constructed as a lookup table indicating the relationship between each of the plurality of capturing portions and the cross section corresponding to each capturing portion. In other words, the information 1020 indicating the relationship between the capturing portion and the cross section is information expressing the cross section predetermined for each capturing portion.

Owing to this configuration, a user can confirm an image corresponding to a desired cross section without performing a complicated operation for generating the cross-sectional image data 1030 when the image processing apparatus 130 reads in the volume data 1010.

Each of the apparatuses forming the system according to the present exemplary embodiment may be realized by hardware apparatuses different from one another, or all of the apparatuses may be realized by one hardware apparatus. Functions of the system according to the present exemplary embodiment may be realized by any hardware.

A unit performing an arithmetic function in the system according to the present exemplary embodiment can be realized by a processor, such as a central processing unit (CPU) and a graphics processing (GPU), or an arithmetic circuit, such as a field programmable gate array (FPGA) chip. These units may be realized not only by a single processor or arithmetic circuit, but also by a plurality of processors or arithmetic circuits.

A unit performing a storage function in the system according to the present exemplary embodiment can be realized by a non-transitory storage medium, such as a ROM, a magnetic disk, and a flash memory. Also, the unit performing the storage function may be a volatile medium, such as a random access memory (RAM). A storage medium storing a program is a non-transitory storage medium. The unit performing the storage may be realized not only by a single storage medium, but also by a plurality of storage media.

A unit performing a control function in the system according to the present exemplary embodiment is realized by an arithmetic unit, such as a CPU. The unit performing the control function controls an operation of each constituent element in the system. The unit performing the control function may control each constituent element in the system in response to an instruction signal issued according to various kinds of operations, such as a start of the measurement, from an input unit. In addition, the unit performing the control function reads out a program code stored in the storage unit and controls operation of each constituent element of the modality.

The display apparatus 140 is a display, such as a liquid crystal display, an organic electro luminescence (EL) display, a field emission display (FED), an eyeglass-type display, and a head-mounted display. The display apparatus 140 displays the image based on the volume data, a numerical value at a specific position, and the like. The display apparatus 140 may display a graphical user interface (GUI) for operating the apparatus and the image based on the volume data.

Transmission/reception of the data may be carried out via wired communication or may be carried out wirelessly.

Figure 2:
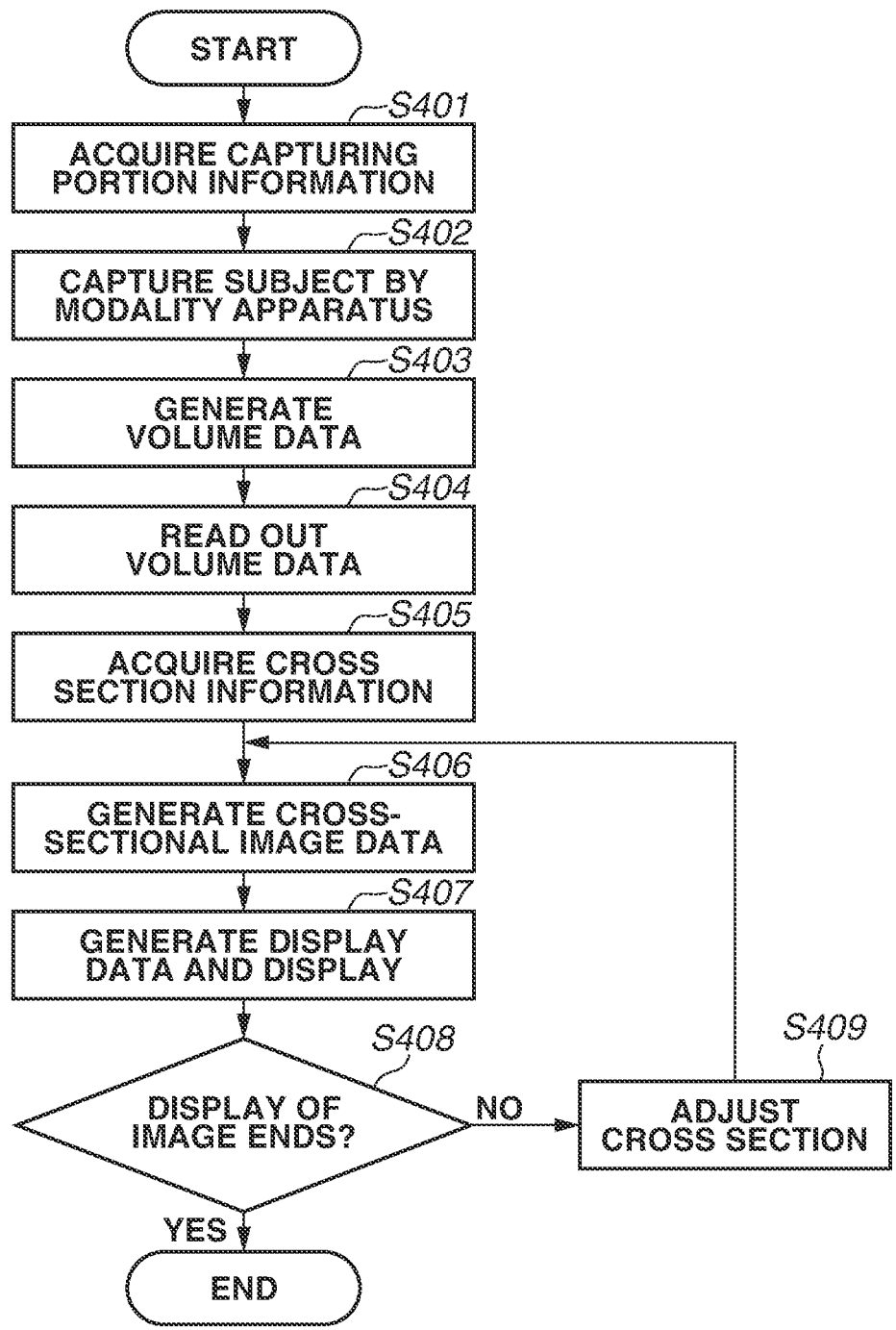
FIG. 2 is a flowchart of an image processing method performed by the system according to the first exemplary embodiment.

In the following description, a flow of an image processing method performed by the system according to the present exemplary embodiment will be described. FIG. 2 is a flowchart of the image processing method performed by the system according to the present exemplary embodiment. The photoacoustic capturing apparatus according to the present exemplary embodiment that will be described below is mainly intended for use in a diagnosis of a vascular disease, in a diagnosis of a malignant tumor of a human or an animal, and in follow-up monitoring after a chemical treatment. Therefore, the photoacoustic capturing apparatus according to the present exemplary embodiment is assumed to handle a part of a living body as the subject.

(Block S401: Process for Acquiring Capturing Portion Information)

The user informs the system, as an instruction, of a type of the portion of the subject to be captured with use of the input unit. The modality apparatus 110 as a portion information acquisition unit acquires the information indicating the capturing portion determined based on the instruction from the user (the capturing portion information). The user can instruct the system to target various capturing portions, such as a breast, an arm, a palm, a back of a hand, a thigh, a shin, and an ankle, according to a purpose of the diagnosis.

An operation console including a mouse, a keyboard, and the like operable by the user can be employed as the input unit. Further, the display apparatus 140 may be configured using a touch panel, thereby allowing the display apparatus 140 to be used as the input unit. Further, as an input method, the input unit may be configured to allow the user to input a text or allow the user to operate the input unit to select and input a desired item from a list on the GUI. The input unit may be configured to allow the user to input a position that the user wants to observe and depth information. The input unit may be provided separately from the other apparatuses.

The information that can be included in the capturing portion information is not only the information specifying the capturing portion itself but also any information as long as the information enables identification of the capturing portion. For example, in a case where the capturing portion can be identified considering the purpose of the diagnosis, information indicating the purpose of the diagnosis may be handled as the information indicating the capturing portion.

(Block S402: Process for Capturing Subject by Modality Apparatus)

The modality apparatus 110 as a capturing unit captures the subject according to a capturing parameter based on the capturing portion information acquired in block S401. Examples of the capturing parameter in the photoacoustic capturing apparatus include a parameter of irradiation light (a light intensity, a wavelength, and the like) and a parameter of a probe (a gain and the like). Besides these parameters, the modality apparatus 110 can set any kind of capturing parameter based on the capturing portion information.

Figure 3:
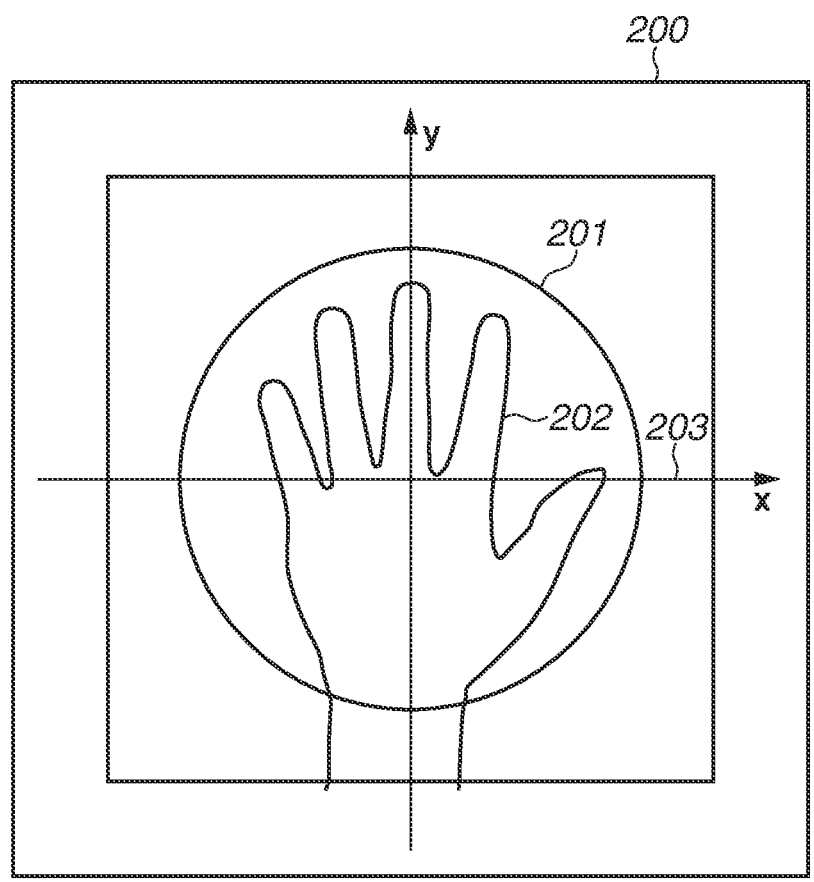
FIG. 3 illustrates a camera image according to the first exemplary embodiment.

Further, in a typical case, the subject is captured in a predetermined capturing posture of the subject according to the capturing portion. The capturing posture refers to a relative positional relationship of the subject to the modality apparatus 110, and, for example, the posture of the subject relative to a reference coordinate system of the apparatus is defined as illustrated in FIG. 3. For example, the modality apparatus 110 may cause the display apparatus 140 to display the capturing posture as an outline on a camera image of the subject that is captured by a camera, based on the capturing portion information. An operator may set the subject so as to align the subject with the outline displayed on the display apparatus 140.

A capturing apparatus including an image sensor, such as a complementary metal-oxide semiconductor (CMOS) sensor and a charge coupled device (CCD) sensor, which are sensitive to a visible light region, can be employed as the camera. The camera can capture a still image and a moving image. FIG. 3 illustrates a camera image on which a posture guide according to the capturing apparatus is displayed being superimposed. In the present exemplary embodiment, the camera image will be described referring to an example in which the user instructs the system to target the back of the hand including fingers as the capturing portion for the purpose of a diagnosis of a disease accompanying inflammation at a joint portion of a finger. An image (not illustrated) of the subject that is captured by the camera is displayed on a camera image 200 in real time. Further, a capturing region 201 of the modality apparatus 110 is displayed on the camera image 200. The capturing region 201 is a region indicating a range where the modality apparatus 110 can capture the image, and the capturing portion of the subject should be set within this region. Further, an outline image 202, which indicates the predetermined capturing posture, is displayed being superimposed on the camera image 200 as the guide. The outline image 202 has a guaranteed positional relationship to the coordinate system of the apparatus. The operator can set the subject so as to align the image of the subject with the outline image 202 while viewing the camera image 200. With the aid of this function, the subject is captured in the posture corresponding to the capturing portion.

Besides, the capturing in the capturing posture according to the capturing portion may be realized by any other applicable method, such as displaying a mark indicating the posture on a unit which holds the subject.

After the subject is set in the specified posture, the modality apparatus 110 (the photoacoustic capturing apparatus in this embodiment) irradiates the subject with pulsed light from a light irradiation unit of the modality apparatus 110. The pulsed light is absorbed by an absorbent in the subject, and the photoacoustic wave is generated from the absorbent. The generated photoacoustic wave is received by a reception unit of the modality apparatus 110.

The light irradiation unit includes a lit source that generates the light and an optical system that guides the light emitted from the light source to the subject. The light includes pulsed light, such as a so-called square wave and triangular wave. A pulse width of the light generated by the light source may be 1 ns or wider, and the pulse width of the light generated by the light source may be 100 ns or narrower. Further, a wavelength of the light may fall within a range from approximately 400 nm to 1600 nm. In a case where a blood vessel is captured at a high resolution, the modality apparatus 110 may employ a wavelength highly absorbable in the blood vessel (400 nm or longer, and 700 nm or shorter). In a case where a deep portion in the living body is captured, the modality apparatus 110 may employ light having a typical wavelength which is absorbable to a small extent at a background tissue of the living body (water, fat, or the like) (700 nm or longer, and 1100 nm or shorter).

A laser or a light-emitting diode can be used as the light source. Further, in a case where the subject is measured using light beams having a plurality of wavelengths, the light source may be a light source which can change the wavelength. Another configuration in the case where the subject is irradiated with the plurality of wavelengths is a plurality of light sources that respectively generate light beams having wavelengths different from one another and that may alternately irradiate the subject. Even when the plurality of light sources is used, they will be collectively described herein as the light source. Various types of lasers, such as a solid-state laser, a gas laser, a dye laser, and a semiconductor laser, can be used as the laser. A pulse laser, such as a neodymium-doped yttrium aluminum garnet (Nd:YAG) laser and an alexandrite laser, may be used as the light source. Also, a titanium sapphire (Ti:sa) laser using Nd:YAG laser light as excitation light or an optical parametric oscillator (OPO) laser may be used as the light source. Also, a flash lamp or a light-emitting diode may be used as the light source. Further, a microwave source may be used as the light source.

An optical element, such as a lens, a mirror, and an optical fiber, can be used for the optical system. For example, in the case where the breast or the like is handled as the subject, a light emission unit of the optical system may be formed by a diffusing plate or the like that diffuses the light to irradiate the subject and expand a beam diameter of the pulsed light. Also for example, in a case where a photoacoustic microscope is used as the modality apparatus 110, the light emission unit of the optical system may be formed by a lens or the like to irradiate the subject and focus the beam so as to increase a resolution. The light irradiation unit may directly irradiate the subject with the light from the light source without including the optical system.

The reception unit includes a transducer that outputs an electric signal when the acoustic wave is received and a support member that supports the transducer. Further, a transducer may also be used as a transmission unit that transmits an acoustic wave. The transducer as the reception unit and the transducer as the transmission unit may be a single (common) transducer or may be configured as different transducers.

A piezoelectric ceramic material (e.g., lead zirconate titanate (PZT)) and a polymer piezoelectric film material (e.g., polyvinylidene fluoride (PVDF)) can be used as a member forming the transducer. Additionally, an element other than the piezoelectric element may be used. For example, an electrostatic capacitance-type transducer (a capacitive micro-machined ultrasonic transducer (CMUT)) or a transducer using a Fabry-Perot interferometer can be used. Any transducer may be employed as long as this transducer can output the electric signal when the acoustic wave is received.

(Block S403: Process for Generating Volume Data)

The modality apparatus 110 as an image data generation unit processes the reception signal of the photoacoustic wave received by the reception unit to generate the volume data (the three-dimensional medical image data) 1010. In the present exemplary embodiment, the modality apparatus 110 generates the volume data 1010 associated with the capturing portion information that was acquired in block S401 and outputs the volume data 1010 to the storage apparatus 120. The storage apparatus 120 stores the volume data 1010 associated with capturing portion information. The data output to the storage apparatus 120 may comply with, for example, the Digital Imaging and Communications in Medicine (DICOM) standard, which is a standard specification for a medical image and communication. Three-dimensional medical image data acquired by various kinds of modality apparatuses is converted into the DICOM format and is stored into a server or a storage. After that, a desired image is generated by an image processing apparatus and displayed. The DICOM file can include, in addition to the three-dimensional medical image data, metadata regarding the three-dimensional medical image data. The three-dimensional medical image data is recorded in a data setting section, and the metadata is recorded in a file header section as the supplementary information. The DICOM file is managed and operated in various kinds of medical image management systems.

In the present exemplary embodiment, the three-dimensional medical image data is recorded in the data setting section of the DICOM file, and the capturing portion information is recorded in the file header section of the DICOM file as the supplementary information.

As a reconstruction algorithm for converting the reception signal data into the volume data 1010 as the three-dimensional spatial distribution, the modality apparatus 110 can employ any applicable method, such as the back projection method in the time domain, the back projection method in the Fourier domain, and the model-based method. (the iterative calculation method). Examples of the back projection method in the time domain include universal back projection (UBP), filtered back projection (FBP), and Delay-and-Sum.

(Block S404: Process for Reading Out Volume Data)

The image processing apparatus 130 as an image data acquisition unit acquires the volume data 1010 by reading out the volume data 1010 stored in the storage apparatus 120. In the case where the storage apparatus 120 is the PACS, the image processing apparatus 130 may acquire the volume data 1010 from the server via the network. The user may specify the volume data 1010 to be acquired by the image processing apparatus 130 by operating the GUI displayed on the display apparatus 140.

In the present exemplary embodiment, the described system refers to the example in which the modality apparatus 110 captures the subject and generates the volume data 1010, but the present exemplary embodiment may start from the block in which the image processing apparatus 130 reads out the volume data 1010 from the storage apparatus 120. In other words, the image processing method according to the present exemplary embodiment does not need to include the capturing of the subject by the modality apparatus 110.

(Block S405: Process for Acquiring Cross Section Information)

The image processing apparatus 130 as a cross section information acquisition unit acquires the information indicating the cross section (the cross section information) based on the supplementary information of the volume data 1010. The cross section information is information used for generating the cross-sectional image data 1030 from the volume data 1010. The cross section information is information indicating, for example, the position and the posture of the cross section defining the cross-sectional image displayed on the display apparatus 140. The cross section information is information indicating a coordinate of a central position of the cross section, a direction of the cross section, a range of the cross section, a slice thickness when the cross-sectional image data 1030 is generated, and the like. The cross section information can be expressed by any applicable technique, such as a coordinate of the cross section and a function expressing the cross section.

In many cases, a position of a cross section desirable for observation is predetermined according to a type of the capturing portion of the subject. For example, in the case where the subject is captured for the purpose of diagnosis of disease accompanying the inflammation at the joint of the finger, it is desirable that the back side of the hand is selected as the capturing portion of the subject, and a vertical cross section along a longitudinal direction of each finger is set as the cross section.

Therefore, the image processing apparatus 130 can determine the cross section corresponding to the capturing portion associated with the volume data 1010 based on the capturing portion information as the supplementary information stored in the header section of the DICOM file and on the information indicating the relationship between the capturing portion and the cross section. In other words, the image processing apparatus 130 can acquire the cross section information indicating the cross section corresponding to the capturing portion indicated by the capturing portion information. The information indicating the relationship between the capturing portion and the cross section may be formed by a lookup table in which each of the plurality of capturing portions, and the position and the posture of the cross section corresponding to each of the capturing portions, are associated with each other. This lookup table may be stored in the storage apparatus 120, or may be stored in a storage apparatus different from the storage apparatus 120 (for example, a storage unit of the image processing apparatus 130). The image processing apparatus 130 can determine the cross section corresponding to the capturing portion by referring to this lookup table.

Figure 4:
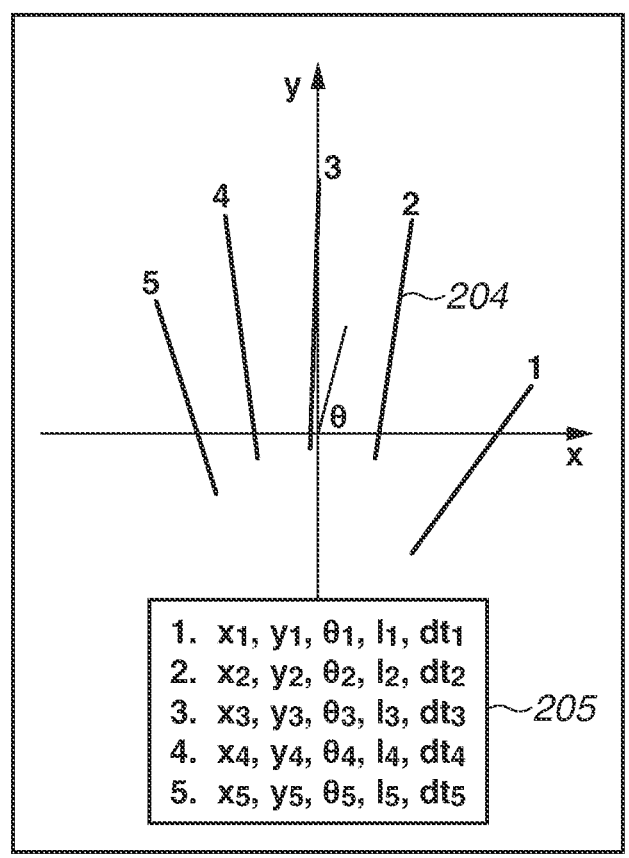
FIG. 4 illustrates cross sections defining cross-sectional images according to the first exemplary embodiment.

For example, if a back of a right hand including fingers is specified as the capturing portion for the diagnosis of the disease accompanying the inflammation at the joint portion of the finger in block S401, the image processing apparatus 130 can acquire cross section information 205 indicating cross sections 204 corresponding to the back of the right hand including the fingers, like an example illustrated in FIG. 4. The cross section information 205 is parameter information required to generate cross sections of five portions that each extend along the longitudinal direction of the finger for each the fingers and in a direction perpendicular to the palm. The cross section information 205 includes parameter information indicating coordinates (x, y) of the central position of the cross section, an angle θ, a length l of the cross section, and a slice thickness dt with respect to the coordinate system of the apparatus. The length l of the cross section and the slice thickness dt may be different values for each finger, and, in a case where an appropriate range and thickness are predetermined for each finger, an appropriate value may be prepared for each piece of the cross-sectional image data 1030. The volume data 1010 corresponds to the coordinate system of the apparatus because the volume data is captured in the posture depending on the capturing portion, and a coordinate system of the cross section information 205 corresponds to the coordinate system of the volume data 1010.

The image processing apparatus 130 as a data generation unit may generate volume data 1040 associated with the cross section information acquired in block S405. Further, the image processing apparatus 130 as a storage control unit may output the volume data 1040 to the storage apparatus 120, thereby causing the storage apparatus 120 to store the volume data 1040. The image processing apparatus 130 may cause the storage apparatus 120 to store the volume data 1040 with the cross section information added, by replacing the volume data 1010 already stored in the storage apparatus 120 with the volume data 1040.

(Block S406: Process for Generating Cross-sectional Image Data)

The image processing apparatus 130 as a cross-sectional image generation unit determines the parameters regarding the cross section, such as the position, the direction, the range, and the slice thickness, for generating the cross-sectional image data based on the cross section information acquired in block S405. The image processing apparatus 130 generates the cross-sectional image data based on volume data corresponding to the determined parameters regarding the cross section. The image processing apparatus 130 identifies the cross section in the volume data that satisfies the position, the direction, and the range defined by the cross section information. Then, the image processing apparatus 130 defines a three-dimensional space (a volume) in the cross section in the volume data is thickened by the slice thickness. The image processing apparatus 130 renders volume data included in the three-dimensional space, thereby generating the cross-sectional image data to be displayed on the display apparatus 140. In other words, the cross-sectional image data includes not only image data expressing a space having a thickness as thick as one voxel but also image data expressing a space having a thickness defined by the cross section information.

Employable rendering methods can be any applicable method, such as maximum intensity projection (MIP), minimum intensity projection (MinIP), average intensity projection (AIP), volume rendering, and surface rendering.

Also, the image processing apparatus 130 may generate image data other than the cross-sectional image data, such as image data in Which an entire region in the volume data is set as a rendering target region, from the volume data. And the image processing apparatus 130 may render the volume data while excluding partial data in the volume data from the rendering target.

(Block S407: Process for Generating and Displaying Display Data)

The image processing apparatus 130 as the display control unit generates the display data to be displayed on the display apparatus 140 based on the cross-sectional image data generated in block S406. The image processing apparatus 130 outputs the generated display data to the display apparatus 140, thereby causing the display apparatus 140 to display the display data.

Figure 5:
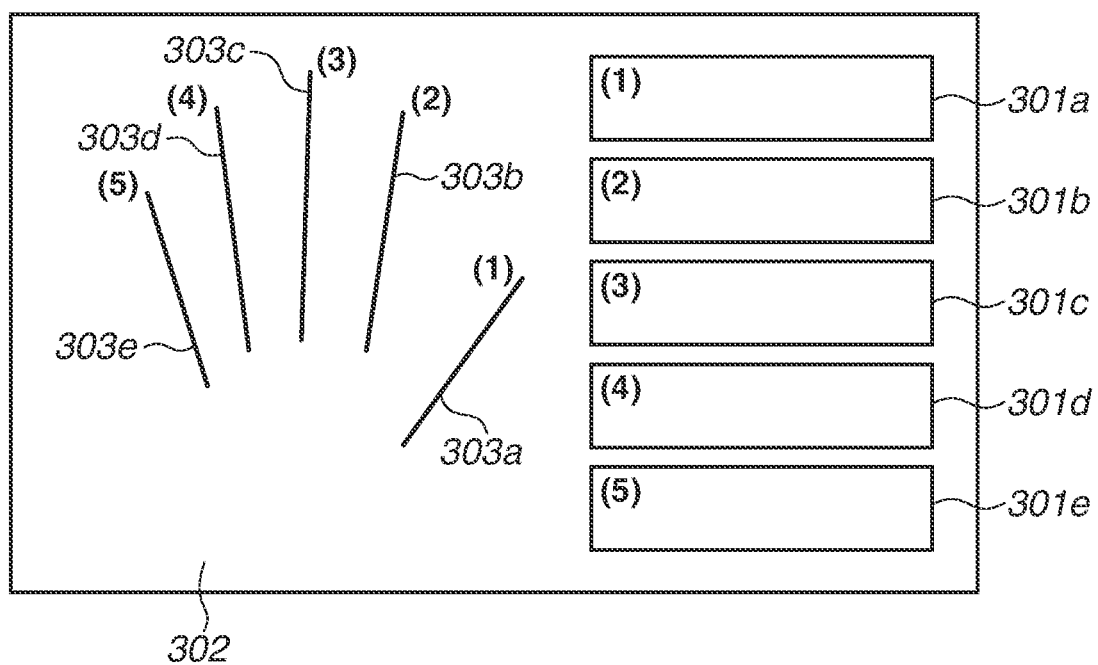
FIG. 5 illustrates display data produced on a display apparatus according to the first exemplary embodiment.

FIG. 5 illustrates one example of the display data displayed on the display apparatus 140. At the time of the diagnosis of the disease accompanying the inflammation at the joint portion of the finger, the diagnosis can be made efficiently because respective cross-sectional images 301a to 301e of the fingers are displayed in parallel. Further, cross section position display lines 303a to 303e (images indicating axes of the fingers) may be displayed while being superimposed on an overall image 302 (an image of the palm) of the volume data to indicate the position, the direction, and the range of each of the cross-sectional images 301a to 301e in the volume data. A visual-line direction when the overall image 302 is generated and visual-line directions when the cross-sectional images 301a to 303e are generated may be different from each other. For example, the overall image 302 may be a two-dimensional MIP image along a direction perpendicular to a plane displayed as the cross-sectional images 301. Further, the visual-line directions of a plurality of cross-sectional images 301a to 301e may be different from one another. For example, in the case where the capturing portion is the fingers, a pad of a thumb tends to be oriented in a direction different from pads of the other fingers when the palm is placed and fixed on a flat plate. Therefore, the visual-line directions may be set in such a manner that the visual-line directions match with each other among the cross sections corresponding to an index finger, a middle finger, a ring finger, and a little finger, while the visual-line direction of the cross section corresponding to the thumb is set to be a direction different from the other fingers. The volume data does not need to be entirely displayed, but may be partially displayed as long as the displayed image extends across a range that allows the user to understand the positions corresponding to the cross-sectional images 301. Further, rendering regions corresponding to each cross section defining the plurality of cross-sectional images 301a to 301e may be different from one another. For example, the image processing apparatus 130 may generate the plurality of cross-sectional images 301a to 301e by rendering each of the five fingers with different slice thicknesses. The above-described parameters regarding the rendering to generate the cross-sectional images 301a to 301e may be included in the cross section information. Further, information which is helpful in easily understanding the correspondences between the cross section position display lines 303 and the cross-sectional images 301((a) to (e) in the case of FIG. 5) may be displayed near the cross section position display lines 303 and the cross-sectional images 301.

That is, the image processing apparatus 130 can cause the display apparatus 140 to display thereon the overall image 302 (a first image) acquired with the visual-line direction set to a first direction. Further, the image processing apparatus 130 can cause the display apparatus 140 to display the overall image 302 (the first image) and the plurality of cross-sectional images 301a to 301e (one or more second images) side by side, each of which is acquired with the visual-line direction set to a second direction different from the first direction. Further, the image processing apparatus 130 can cause the images indicating the plurality of cross sections (the cross section position display lines 303a to 303e) to be displayed being superimposed on the overall image 302. Further, the image processing apparatus 130 may cause each of the cross-sectional images 301 to be displayed in a smaller size than the overall image 302. Further, the image processing apparatus 130 may be configured to change the visual-line direction of the overall image 302 or the cross-sectional images 301. The visual-line direction may be changed to a direction determined based on an instruction from the user or may be changed automatically.

These displays may be automatically presented on the display apparatus 140 as initial images after the user selects the volume data and the image processing apparatus 130 reads in the volume data. Additionally, these displays may be presented on the display apparatus 140 by the user's performing an operation for presenting these displays with use of the input unit. In this manner, the cross-sectional image is displayed without requiring the user to perform a complicated operation with respect to specifying of the cross section information, such as specifying the cross section position.

This configuration allows the user to easily understand what kind of cross section each of the displayed cross-sectional images 301 indicates in terms of the position, the direction, and the range relative to the acquired volume data of the subject.

(Block S408: Process for Determining Whether to End Display of Image)

If information indicating an end of the image display is received through the input unit from the user (YES in block S408), the image processing apparatus 130 ends the image display onto the display apparatus 140. Besides, if the image processing apparatus 130 does not receive the instruction to end the image display (NO in block S408), the processing proceeds to block S409.

(Block S409: Process for Adjusting Cross Section)

The user can adjust the cross section determined in block S405 by the input unit. For example, the user can change the displayed cross sections by adjusting the cross section position display lines 303 on the GUI while confirming the cross-sectional images 301 displayed on the display apparatus 140. In other words, the image processing apparatus 130 can update the cross section information based on the user's instruction to change the cross sections that is issued when the cross-sectional images 301 are being displayed. The image processing apparatus 130 can update the cross section information, such as the position, the direction, and the slice thickness, of the cross section based on the instruction from the user.

The image processing apparatus 130 may output, to the storage apparatus 120, the volume data to which the cross section information after the adjustment is added. At this time, the image processing apparatus 130 may cause the storage apparatus 120 to store the volume data, to which the cross section information after the adjustment is added, by replacing the volume data already stored in the storage apparatus 120 with it.

The present exemplary embodiment has been described referring to the example in which the back side of the hand including the fingers is the subject for the purpose of the diagnosis of the disease accompanying the inflammation at the joint of the finger. However, the subject is not limited to the back side of the hand and may be another portion of a human body. Further, the cross section information, such as the direction, the position, and the slice thickness of the cross section, can be varied according to a diagnosis target. For example, when a blood vessel around a surface of the skin of an upper arm is targeted for the diagnosis, a cross section direction may be extended in parallel with the skin to generate the cross section information, such that a position of the cross section may be placed along a longitudinal direction of the arm defined by the capturing posture.

In the above-described manner, according to the system relating to the present exemplary embodiment, the cross section information can be acquired from the supplementary information associated with the volume data. Further, according to the system relating to the present exemplary embodiment, by generating the cross-sectional image based on the cross section information acquired from the supplementary information, the desired cross-sectional image can be displayed without requiring the user to perform the complicated operation for displaying the cross-sectional image.

A second exemplary embodiment will be described, which converts the volume data output from the modality apparatus into the cross-sectional image data in real time and displays the cross-sectional image in real time.

Figure 6:
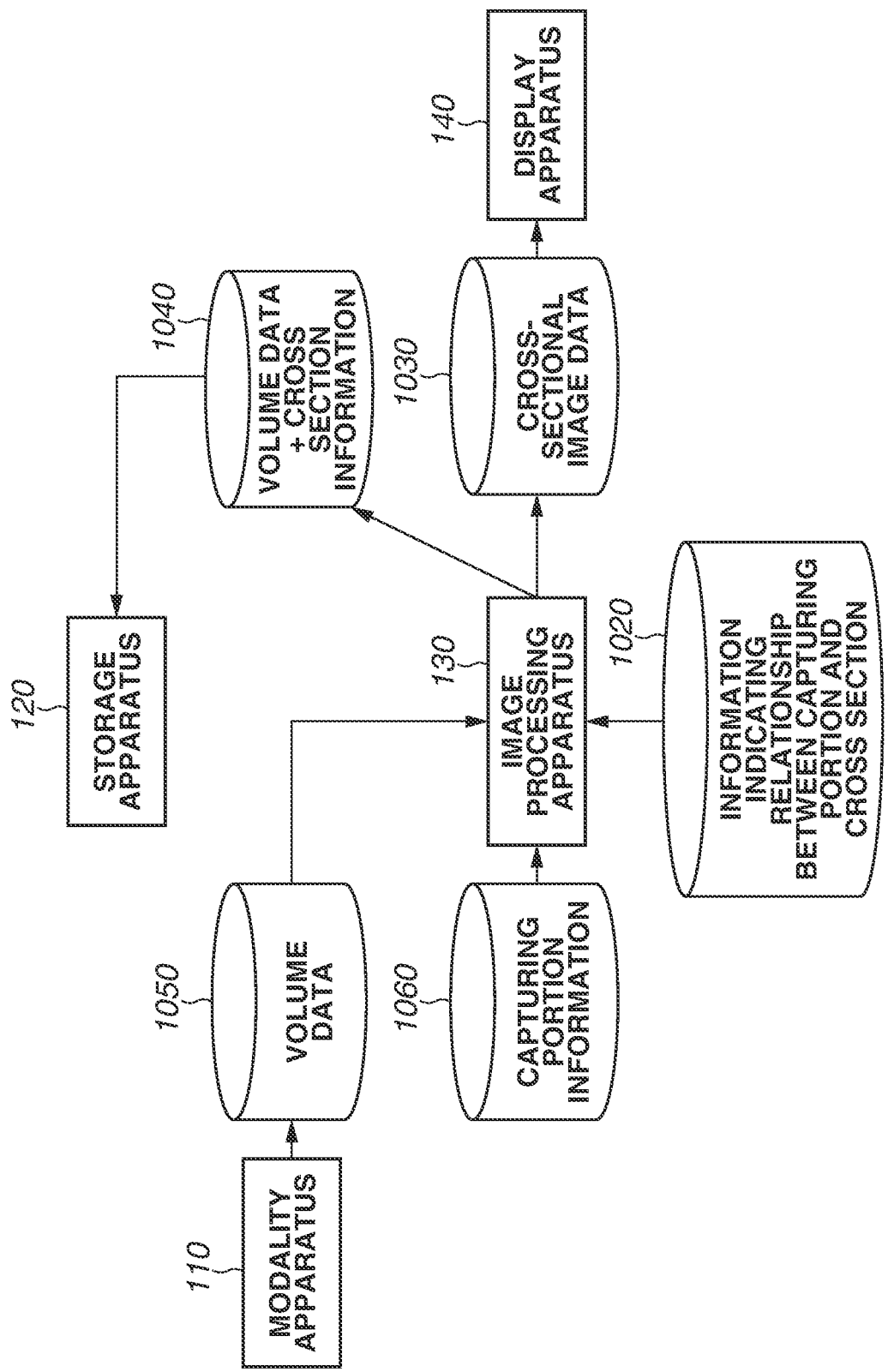
FIG. 6 is a block diagram of apparatuses included in a system according to a second exemplary embodiment and data exchanged among the apparatuses.

FIG. 6 illustrates a block diagram of apparatuses included in a system according to the present exemplary embodiment and data exchanged among the apparatuses. Configurations or data similar to the first exemplary embodiment will be identified by the same reference numerals, and detailed descriptions thereof will be omitted. Further, similar processes to the processes illustrated in FIG. 2 will be identified by the same reference numerals, and detailed descriptions thereof will be omitted. A system in which the modality apparatus 110, the image processing apparatus 130, and the display apparatus 140 are integrated may be provided to capture the subject and display the cross-sectional image in real time.

In the present exemplary embodiment, the modality apparatus 110 captures the subject, and outputs volume data 1050 to the image processing apparatus 130. The image processing apparatus 130 receives the volume data 1050 output from the modality apparatus 110. Methods similar to block S402 and block S403 can be employed to capture the subject and generate the volume data 1050.

The image processing apparatus 130 acquires capturing portion information 1060 indicating the portion of the subject that is captured by the modality apparatus 110. In the present exemplary embodiment, even when the capturing portion information is not associated with the volume data 1050 as the supplementary information, the image processing apparatus 130 acquires the capturing portion information 1060 by a different method.

Figure 7:
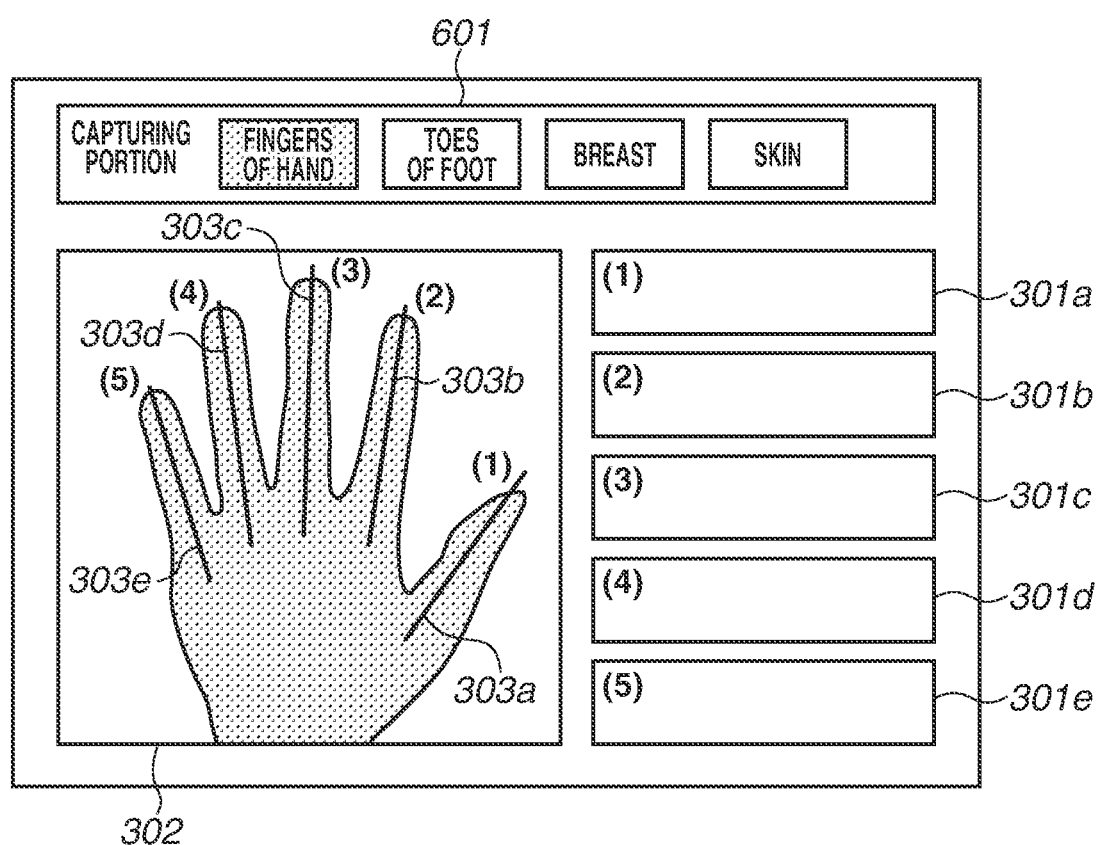
FIG. 7 illustrates display data produced on a display apparatus according to the second exemplary embodiment.

The image processing apparatus 130 may acquire the capturing portion information 1060 based on an instruction from the user. For example, as illustrated in FIG. 7, the image processing apparatus 130 may cause the display apparatus 140 to display a GUI 601 on which the user can select the capturing portion from a plurality of capturing portions with use of the input unit. On the GUI 601 illustrated in FIG. 7, the user can select the capturing portion from fingers, toes, a breast, and skin. FIG. 7 illustrates an example when the user selects the fingers as the capturing portion.

Also, the image processing apparatus 130 may acquire the capturing portion information 1060 by analyzing the volume data 1050 and identifying the capturing portion. For example, the image processing apparatus 130 may detect a characteristic structure contained in the volume data 1050 and acquire the capturing portion information 1060 indicating a portion corresponding to this characteristic structure. Also, the image processing apparatus 130 may carry out template matching with a structure included in the volume data 1050 using information indicating a characteristic structure of each capturing portion as a template and acquire the capturing portion information 1060 indicating a capturing portion yielding a high matching degree. Any applicable method may be employed to identify the capturing portion from the volume data 1050.

Additionally, the image processing apparatus 130 may read out and acquire the capturing portion information 1060 indicating the capturing portion from examination order information output from a hospital information system (HIS) or a radiology information system (RIS).

Subsequently, the image processing apparatus 130 acquires the cross section information based on the capturing portion information 1060 acquired in the above-described manner. A method similar to block S405 according to the first exemplary embodiment can be employed as a method for acquiring the cross section information from the capturing portion information 1060.

The image processing apparatus 130 can cause the cross-sectional image to be displayed based on the cross section information in a manner similar to blocks S406 and S407 according to the first exemplary embodiment. In the present exemplary embodiment, the cross section may also be adjusted in a manner similar to block S409 according to the first exemplary embodiment.

The image processing apparatus 130 not only outputs the cross-sectional image data 1030 to the display apparatus 140, but also may output the volume data 1040 associated with the acquired cross section information to the storage apparatus 120. In other words, the image processing apparatus 130 may cause the storage apparatus 120 to store the volume data 1040. Further, if the cross section is adjusted in block S409, the image processing apparatus 130 may output, to the storage apparatus 120, the volume data associated with the adjusted cross section information. At this time, the image processing apparatus 130 may cause the storage apparatus 120 to store the volume data to which the adjusted cross section information is added by replacing the volume data already stored in the storage apparatus 120 with it.

In the above-described manner, according to the system of the present exemplary embodiment, the cross section information can be acquired from the acquired capturing portion information even when the supplementary information is not associated with the volume data. Further, according to the system of the present exemplary embodiment, by generating the cross-sectional image based on the cross section information acquired from the capturing portion information, the desired cross-sectional image can be displayed without requiring the user to perform the complicated operation for displaying the cross-sectional image. Further, according to the system of the present exemplary embodiment, the cross-sectional image of the desired cross section can be displayed in real time in conjunction with the capturing of the subject.

Figure 8:
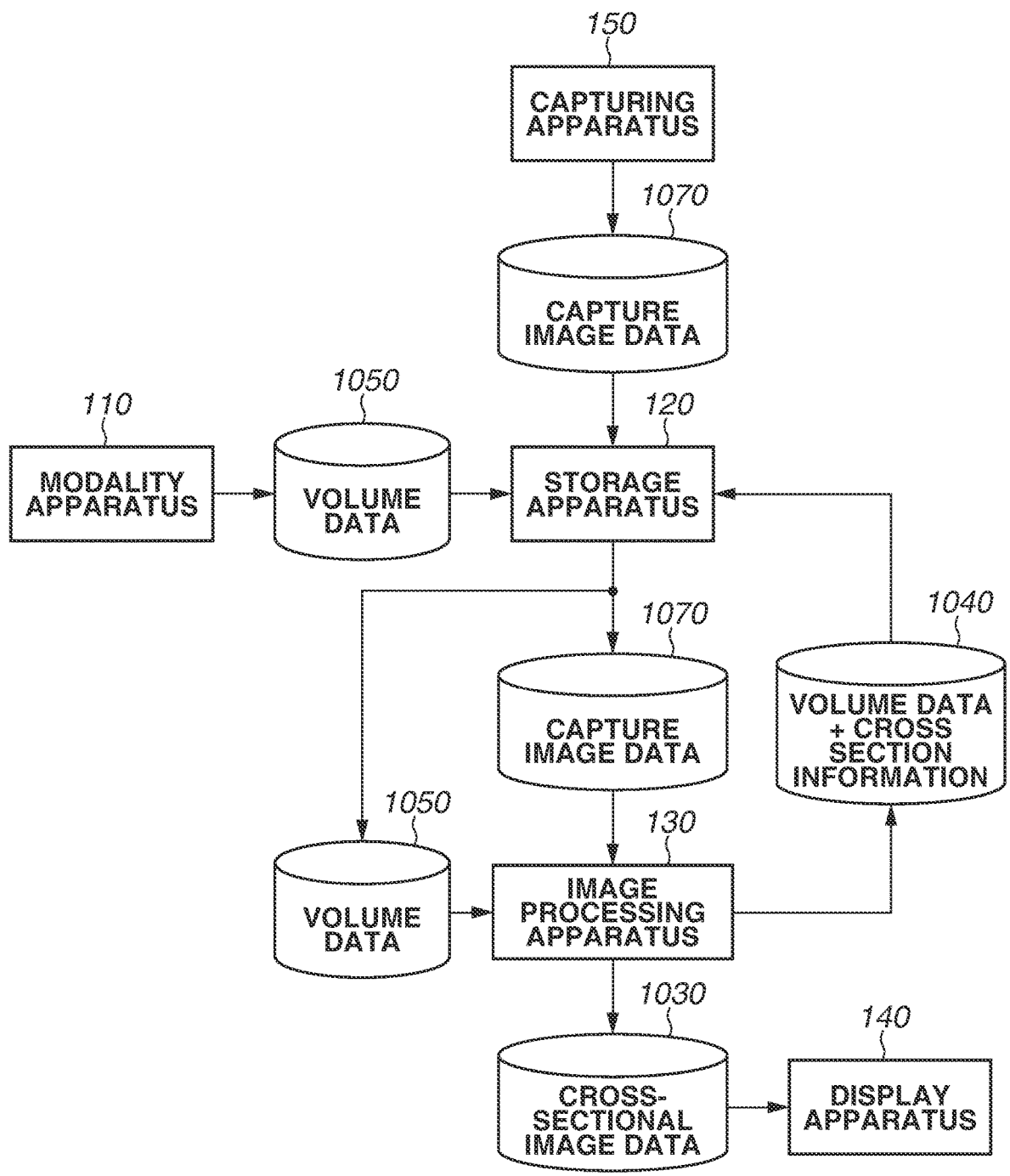
FIG. 8 is a block diagram of apparatuses included in a system according to a third exemplary embodiment and data exchanged among the apparatuses.

In the following description, a third exemplary embodiment will be described with reference to the drawings. The present exemplary embodiment is different from the first exemplary embodiment in that the cross section information is acquired using a capture image generated by a capturing apparatus different from the modality apparatus. FIG. 8 illustrates a block diagram of apparatuses included in a system according to the present exemplary embodiment and data exchanged among the apparatuses. Configurations similar to the first exemplary embodiment will be identified by the same reference numerals, and detailed descriptions thereof will be omitted.

The system according to the present exemplary embodiment includes the modality apparatus 110, the storage apparatus 120, the image processing apparatus 130, the display apparatus 140, and a capturing apparatus 150. The modality apparatus 110 captures the subject, generates the three-dimensional medical image data (hereinafter also referred to as the volume data) 1050 of the subject, and outputs the data 1050 to the storage apparatus 120. The capturing apparatus 150 is an apparatus for generating capture image data 1070 of the subject. An optical camera including an image sensor, such as the CMOS sensor and the CCD sensor which are sensitive to the visible light region, may be employed as the capturing apparatus 150.

The capture image data 1070 is an image captured for the purpose of confirming the position of the subject relative to the apparatus and the state of the subject. The capture image data 1070 may also be used as a reference image when the position of the subject is aligned at the time of the capturing by the modality apparatus 110 or may be used at the time of radiological interpretation. Therefore, a positional correspondence may be established in advance between the capture image data 1070 generated by the capturing apparatus 150 and the volume data 1050 generated by the modality apparatus 110. The capturing apparatus 150 may be mounted on the modality apparatus 110 to establish the positional correspondence between the capture image data 1070 and the volume data 1050.

In a case where the subject has been examined by another modality in advance and an observation target (i.e., a portion desired to be observed) is already known from the display of the cross section, a position of the observation target can be marked on the surface of the subject. For example, the observation target is a tumor in a breast in a diagnosis of a breast cancer, and is a penetrating branch under the skin in a skin flap surgery for a skin graft surgery.

By marking the position of the observation target on the surface of the subject, the position of the cross-sectional image to be generated can be confirmed from the capture image data 1070. Marking the position of the observation target may reduce an influence of the capturing on the modality apparatus 110, and the marked position can be easily detected in analyzing the capture image data 1070. For example, in the case where the photoacoustic capturing apparatus is employed as the modality apparatus 110, a marking made with red ink or the like may be used.

The image processing apparatus 130 can detect the position of the mark from the capture image data 1070. A commonly-used image processing technique may be used for the detection of the position of the mark, and a feature detection technique, such as edge detection processing and pattern search processing, may be employed. Further, the image processing apparatus 130 determines the cross section information from information indicating the detected position of the mark.

The image processing apparatus 130 associates the cross section information, as the supplementary information, with the three-dimensional medical image data, and outputs the three-dimensional medical image data (volume data) with the cross section information 1040. From the output cross-sectional image data 1030, the cross-sectional image of the three-dimensional medical image data at the position of the observation target is generated and displayed on the display apparatus 140 based on the cross section information recorded as the supplementary information.

In the following description, a flow for displaying the cross-sectional image according to the present exemplary embodiment will be described with reference to FIG. 9. FIG. 9 is a flowchart illustrating a method for determining the cross section information and a method for displaying the cross-sectional image that are performed by the system according to the present exemplary embodiment.

In block S601, the capturing apparatus 150 captures the subject and generates the capture image data 1070. In the present exemplary embodiment, the mark indicating the position of the observation target, which has been acquired from the information of another modality, is placed on the surface of the subject.

In block S602, the image processing apparatus 130 detects the position of the mark placed on the surface of the subject from the capture image data 1070 acquired in block S601, and determines the cross section information. The cross section information for generating the cross-sectional image including the observation target is determined from the detected position of the mark. In S603, the determined cross section information is output in the volume data 1040, which associates the cross section information with the volume data 1050.

In the present example, the system has been described referring to the example in which the mark indicating the position of the observation target is placed in advance on the surface of the subject, but the cross section information may be determined by analyzing the capture image data 1070 when no mark is placed. For example, when the palm is specified as the subject by the user, the image processing apparatus 130 may detect a shape of the finger from the capture image data 1070 and determine the cross section information.

Further, in the present exemplary embodiment, the system has been described referring to the example in which the capturing apparatus 150 is the optical camera provided in the photoacoustic capturing apparatus, but the capturing apparatus 150 may be different from the photoacoustic capturing apparatus and be any suitable capturing apparatus. For example, the capturing apparatus 150 may be an ultrasonic apparatus that transmits an ultrasonic wave to the subject and captures subject information from the reflected ultrasonic wave.

In the above-described manner, according to the system of the present exemplary embodiment, the cross section information can be acquired from the capture image data obtained by the capturing apparatus that is different from the modality apparatus even when the supplementary information regarding the cross section information is not associated with the volume data. Further, according to the system of the present exemplary embodiment, by generating the cross-sectional image based on the cross section information acquired from the capture image data, the desired cross-sectional image can be displayed without requiring the user to perform the complicated operation for displaying the cross-sectional image.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-196054, which was filed on Oct. 6, 2017 and which is hereby incorporated by reference herein in its entirety.

What is claimed is:

1. An image processing apparatus comprising:
a memory storing a program; and
one or more processors which, by executing the program, function as:
a data acquisition unit configured to acquire data in which three-dimensional medical image data and supplementary information are associated with each other;
a cross section information acquisition unit configured to acquire the supplementary information from the data and acquire cross section information indicating a cross section based on the supplementary information;
a cross-sectional image generation unit configured to generate cross-sectional image data corresponding to the cross section based on the three-dimensional medical image data and the cross section information; and
a display control unit configured to cause a display unit to display an image based on the cross-sectional image data.

2. The image processing apparatus according to claim 1, wherein the supplementary information includes capturing portion information indicating a capturing portion,
wherein the cross section information acquisition unit acquires information indicating the cross section corresponding to the capturing portion based on the cross section information and the capturing portion information, and
wherein the cross-sectional image generation unit generates the cross-sectional image data based on the information indicating the cross section corresponding to the capturing portion and the three-dimensional medical image data.

3. The image processing apparatus according to claim 1, wherein the supplementary information includes the cross section information, and
wherein the cross section information acquisition unit acquires the cross section information from the data.

4. The image processing apparatus according to claim 1, wherein the cross section information acquisition unit acquires the cross section information indicating a plurality of the cross sections which are different from one another,
wherein the cross-sectional image generation unit generates a plurality of pieces of the cross-sectional image data corresponding to the plurality of cross sections, and
wherein the display control unit causes the display unit to display the image based on the plurality of pieces of cross-sectional image data.

5. The image processing apparatus according to claim 4, wherein the cross-sectional image generation unit generates the plurality of pieces of cross-sectional image data by projecting the three-dimensional medical image data corresponding to each of the plurality of cross sections with thicknesses different from one another.

6. The image processing apparatus according to claim 1, wherein the one or more processors, by executing the program, further function as:
  a data generation unit configured to generate data in which the three-dimensional medical image data and the cross section information are associated with each other; and
  a storage control unit configured to cause a storage unit to record the data.

7. The image processing apparatus according to claim 6, wherein the data generation unit generates the data in a DICOM format, and
  wherein the data generation unit stores the cross section information in a header section of a DICOM file.

8. The image processing apparatus according to claim 1, wherein the display control unit causes the display unit to display side by side a first image of the three-dimensional medical image data that is acquired with a visual-line direction set to a first direction and a second image corresponding to each of a plurality of cross sections different from one another that is acquired with the visual-line direction set to a second direction different from the first direction, and
  wherein the display control unit causes an image indicating each of the plurality of cross sections to be displayed with this image superimposed on the first image.

9. The image processing apparatus according to claim 8, wherein the second direction is a direction perpendicular to the first direction.

10. The image processing apparatus according to claim 8, wherein the display control unit is configured to change at least one of the first direction and the second direction.

11. The image processing apparatus according to claim 8, wherein the first image is an image of a palm, the second image is a cross-sectional image of a finger, and the image indicating each of the plurality of cross sections is an image indicating an axis of the finger.

12. The image processing apparatus according to claim 8, wherein the three-dimensional medical image data is image data captured by a photoacoustic capturing apparatus.

13. An image processing method comprising:
  acquiring data in which three-dimensional medical image data and supplementary information are associated with each other;
  acquiring the supplementary information from the data;
  acquiring cross section information indicating a cross section based on the supplementary information;
  generating cross-sectional image data corresponding to the cross section based on the three-dimensional medical image data and the cross section information; and
  causing a display unit to display an image based on the cross-sectional image data.

14. The image processing method according to claim 13, wherein the three-dimensional medical image data is image data captured by a photoacoustic capturing apparatus.

15. A non-transitory storage medium storing a program for causing a computer to perform operations comprising:
  acquiring data in which three-dimensional medical image data and supplementary information are associated with each other;
  acquiring the supplementary information from the data;
  acquiring cross section information indicating a cross section based on the supplementary information;
  generating cross-sectional image data corresponding to the cross section based on the three-dimensional medical image data and the cross section information; and
  causing a display unit to display an image based on the cross-sectional image data.

* * * * *